United States Patent Office 3,153,576
Patented Oct. 20, 1964

3,153,576
PREPARATION OF AN ALKALI METAL PEROXIDE
Dale L. Schechter, Midland, Mich., assignor to The Dow Chemical Company, Midland, Mich., a corporation of Delaware
No Drawing. Filed June 16, 1960, Ser. No. 36,498
4 Claims. (Cl. 23—184)

This invention relates to a process for the preparation of an alkali metal peroxide. More particularly, it pertains to an improved process for the preparation of an alkali metal peroxide or superoxide where the alkali metal in an amalgam is oxidized to the peroxide by intimately contacting the amalgam with air.

It is well known that sodium peroxide or potassium superoxide may be prepared by oxidation of an amalgam containing the respective alkali metal. Numerous methods have been used to effect the oxidation of these metals in the amalgam. Of these methods the most convenient is to contact the amalgam with a gas stream containing oxygen. While various gas streams containing oxygen may be used to effect the oxidation, the yield heretofore obtained when air has been used has been substantially below the yield obtained with relatively pure oxygen. Air is the cheapest and most available source of oxygen. Thus, it would be greatly desirable to provide a process whereby the yields of the alkali metal peroxide obtained are materially improved when air is used as the oxidizing medium.

It is therefore an object of this invention to provide a process for the preparation of an alkali metal peroxide or superoxide by the oxidation of the alkali metal by contacting an amalgam containing the alkali metal with air. A further object is to improve the yield of an alkali metal peroxide obtained when an alkali metal is oxidized to the peroxide by contacting an amalgam containing the alkali metal with air.

The above and other objects are attained, according to the invention, by contacting an amalgam containing an alkali metal such as sodium or potassium with air which has been treated to remove the small amounts of carbon dioxide normally found in atmospheric air. By treating atmospheric air to decrease the carbon dioxide content in the air to less than 100 parts per million of carbon dioxide, the yields of alkali metal peroxide obtained may be increased by as much as 20 percent or more.

The carbon dioxide content of the air as listed in handbooks is 300 parts per million. It was found, in the work leading to this invention, that when the small amount of $CO_2$ that atmospheric air normally contains is reduced to less than 100 parts per million, preferably less than 10 parts per million, the yield of the alkali metal peroxide obtained is materially improved. To find that the removal of such a small amount of carbon dioxide will so materially improve the yields is surprising and unexpected.

The various known methods of removing carbon dioxide from gas streams which will decrease the carbon dioxide content to the desired level may be used. The use of adsorbents or solvents may be used. However, the passage of the air through an alkali, such as sodium hydroxide or potassium hydroxide in particulate form or deposited upon a carrier, may at times be more convenient.

As is well known in the art, it is important to obtain intimate contact of the gas stream with the amalgam to efficiently effect the oxidation of the alkali metal. Numerous methods of agitation have been disclosed to accomplish this. A reactor commonly used to obtain the required contact is a closed cylindrical container horizontally disposed having a plurality of discs rotating on a shaft along the longitudinal axis of the container. The container or reactor is maintained partially full of amalgam so that, as the discs rotate, they are immersed in the amalgam during a fraction of the rotation period. The air stream is passed through the container or reactor above the amalgam and contacts the rotating discs and the fresh amalgam brought to the surface by the agitation produced by the discs. Generally amalgams containing from 0.5 to 0.05 weight percent of alkali metal are used and the oxidation is effected at a temperature of from around 0° to 35° C.

To show the effect of carbon dioxide concentration, a series of runs was made where air containing a different amount of carbon dioxide was used for each run. A run was also made using oxygen.

A reactor was constructed from a 2-inch Pyrex tube. Twenty-six circular, flat, plastic discs slightly smaller than the internal diameter of the tube were assembled on a shaft. The discs were each approximately ¼ inch apart. This assembly was placed in the tube with the shaft being along the longitudinal axis of the tube. At each end of the tube a rubber stopper was inserted with the end of the shaft carrying the plastic discs extending through the stopper. In addition to the rotating discs, two inlet openings at one end and two outlet openings at the other end were provided.

In the operation of the reactor, the reactor was horizontally disposed at a slight incline to enable the amalgam to pass through the reactor. The amalgam at a rate of 30 cubic centimeters per minute and the air at a rate of 7.5 liters per minute were introduced at one end and were discharged through the outlets at the opposite end after flowing concurrently through the reactor. The amalgam in the reactor was maintained so that its level was below the shaft on which the discs were assembled. The discs which were partially immersed in the amalgam were rotated at 850 r.p.m. by the rotation of the shaft. Agitation and mixing of the amalgam was obtained by the discs passing through the amalgam. The runs were made at about 7° centigrade temperature and atmospheric pressure. An amalgam containing 0.05 weight percent of sodium was used.

In one of the runs, the air used was compressed by a mechanical compressor. It was passed through a column of phosphorus pentoxide to remove the moisture and then through a packed column containing sodium hydroxide deposited upon asbestos to remove the carbon dioxide to the extent that the air contained less than 10 p.p.m. of $CO_2$. With the air so treated a yield of sodium peroxide obtained was 69 percent.

The above run was repeated wherein the air was treated only to remove the moisture. A yield of only 50.5 percent was obtained.

The run was again repeated using pure oxygen. The yield obtained was 72 percent.

Oxygen and nitrogen from cylinders were combined to form a gas stream containing 20 mole percent oxygen and 80 mole percent nitrogen. After drying this stream, 2000 p.p.m. of carbon dioxide were added. With this gas stream a yield of only 34 percent was obtained.

Similar results are obtained when potassium amalgam is used in place of sodium amalgam.

What is claimed is:
1. A process for the preparation of alkali metal peroxides and superoxides which comprises; providing a source of substantially moisture-free air having a carbon dioxide content of less than 100 parts of carbon dioxide per million parts of air and intimately contacting an amalgam of an alkali metal selected from the group consisting of sodium and potassium with a stream of said air thereby to oxidize the alkali metal in the amalgam and prepare the corresponding alkali metal peroxide and superoxide.

2. A process according to claim 1 wherein the carbon dioxide in the air is removed to less than 10 parts of carbon dioxide per million parts of air.

3. A process according to claim 2 wherein the alkali metal in the amalgam is sodium.

4. A process according to claim 2 wherein the alkali metal in the amalgam is potassium.

References Cited in the file of this patent

UNITED STATES PATENTS

| | | |
|---|---|---|
| 307,041 | Herzog | Oct. 21, 1884 |
| 359,424 | Brin et al. | Mar. 15, 1887 |
| 500,697 | Webb et al. | July 4, 1893 |
| 2,086,778 | Peffer et al. | July 13, 1937 |
| 2,784,061 | Cunningham | Mar. 5, 1957 |

FOREIGN PATENTS

| | | |
|---|---|---|
| 14,925 | Great Britain | 1890 |

OTHER REFERENCES

J. W. Mellor's "A Comprehensive Treatise on Inorganic and Theoretical Chemistry," vol. 4, 1923 ed., page 1018, Longmans, Green & Co., N.Y.

M. Berthelot: "Ann. Chim. Phys.," 18, 435 (1879).